2,995,829
Patented Aug. 15, 1961

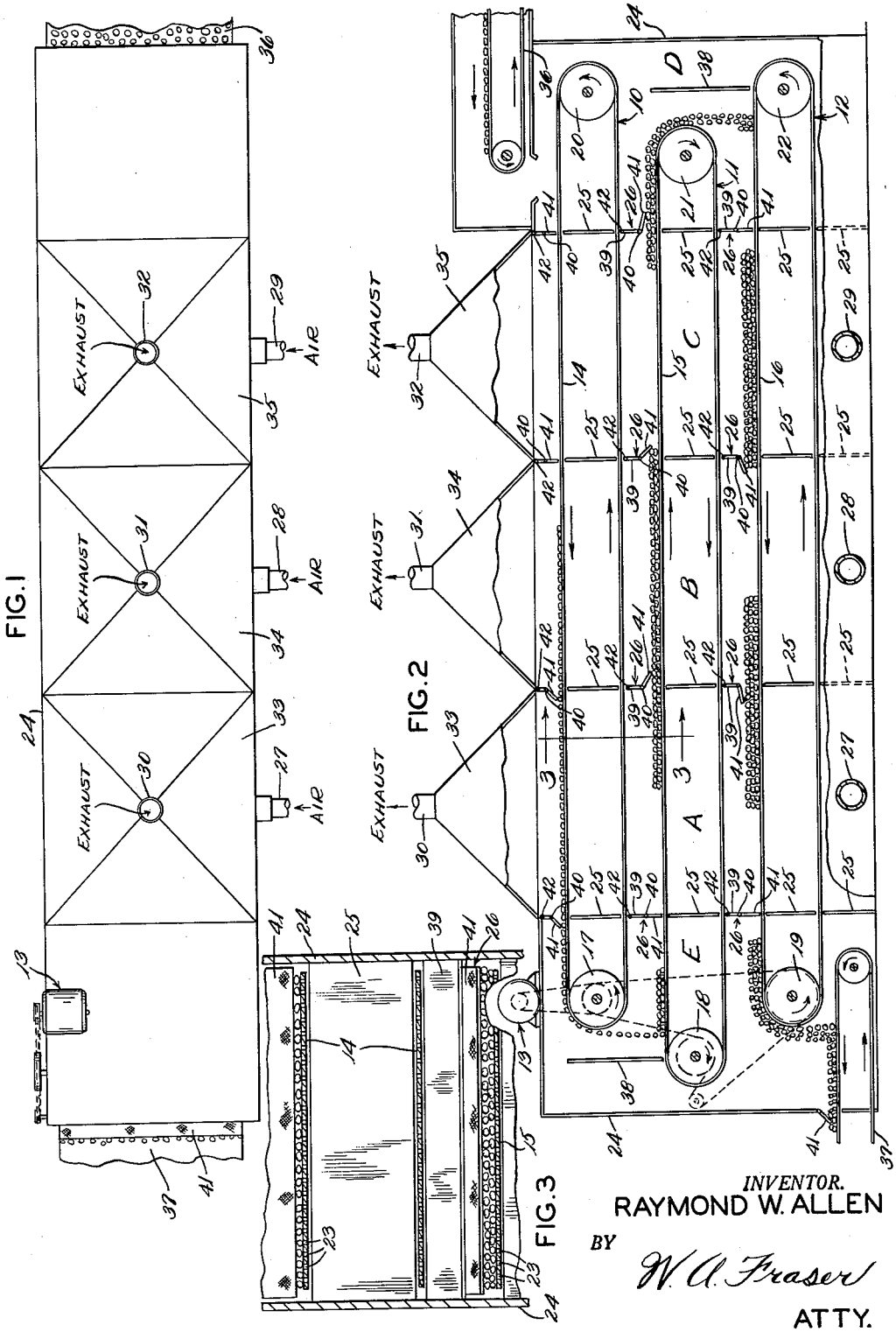

2,995,829
METHOD AND APPARATUS FOR DRYING AND COOLING SUB-DIVIDED MATERIAL
Raymond W. Allen, Franklin Township, Summit County, Ohio, assignor to The Firestone Tire & Rubber Company, Akron, Ohio, a corporation of Ohio
Filed June 18, 1957, Ser. No. 666,410
1 Claim. (Cl. 34—203)

This invention relates to drying and cooling conveyors and more particularly to a method and apparatus for the efficient drying and cooling of pelletized, rubber-like materials.

Such materials are frequently reduced to pellet form to facilitate storing, weighing, conveying, and compounding, and while the subsequent description is directed to the processing of rubber, the method and apparatus are also adaptable to plastics and other materials of a similar nature.

Such materials are sometimes subdivided by means of chopping devices and often are produced in crumb form. The invention hereinafter described is useful in the drying and cooling of such materials in these forms.

The formulation of rubber compounds from their basic ingredients is usually done on a batch basis, and while the invention in its preferred form is especially useful in drying and cooling pellets in discrete batches, the invention should not be construed to be so limited for the method and apparatus are also applicable to a continuous process.

Conventional rubber pelletizing machines extrude the rubber in the form of small rods which are cut off by rotating knives, thereby forming small pellets. Frictional heat is generated during the mastication of the rubber within the pelletizer, and the pellets emerge at elevated temperatures. This heat must be removed before the pellets are stored because the tackiness and plasticity of rubber increase at elevated temperatures, and if precautionary steps are not taken, the pellets, upon contact with each other, agglomerate into an unworkable mass. The common practice to prevent such agglomeration is to extrude and cut the pellets into either a bath or a mist of an anti-adherent agent dispersed in water, thereby completely covering them with a protective film. The pellets emerge from this operation wet and hot and must be dried and cooled before storage. They cannot be stored hot because those on the bottom of the storage pile are deformed by the weight of those above. This deformation is aggravated by the increased plasticity of the hot pellets beyond the point at which the anti-adherent film is ruptured. Such rupture exposes unprotected surfaces which knit together.

Water has a deleterious effect when mixed into rubber compounds, and for this reason it is essential to dry the pellets. It is impractical to dry and cool the pellets in the storage containers because of the large bulk of pellets, so these operations are performed immediately after the pellets are formed.

The thermal conductivity of rubber is low and in cooling rubber pellets it is desirable to maintain as high a temperature differential between the pellets and the cooling air as is practicable so that the heat within the pellets will move to their surfaces and be transferred to the air. In still air, an envelope of warmer air surrounds the pellets and acts as a blanket which reduces the heat transfer rate from within the pellets. By passing the cooling air through a layer of pellets, this insulating blanket of warmer air is flushed away. On the other hand, the movement of cooling air over the surface of the pellet layer merely flushes the blanket from the surface of the layer. For this reason, the movement of air through a pellet layer maintains a higher temperature differential between the pellets and the air and a correspondingly higher heat transfer rate than does the movement of air over the pellet layer. As a consequence, the movement of air through the pellet layer results in a more efficient utilization of the cooling air.

Conventionally, pellets are dried and cooled by passing air at ambient temperature and countercurrent to the flow of pellets through enclosed screw conveyors. While the air is passed through the conveyors, it does not move through the pellet layer. The inherent structure of screw conveyors is such that the air passes over the layer of pellets as they are moved forward by the flights of the screw. Thus, the insulating blanket of warmer air is not completely flushed away. Such conveyor systems are inefficient in the utilization of the cooling air and, as a result, they require large quantities of air and long lengths of conveyors which occupy considerable floor space. Because the pellets are produced in discrete batches, in some conventional systems there may be intervals between batches when there are no pellets in a particular screw conveyor and the air is completely wasted by being exhausted directly to the atmosphere without having performed any drying or cooling.

The present invention provides apparatus comprising a compartmented enclosure, with conveyors and drying and cooling means; and a method to dry and cool pellets efficiently, requiring less air, a shorter total length of conveyors, and a minimum of floor space. This invention realizes these advantages by passing the air at ambient temperature upward through the pellets while they move downward in a cascade arrangement. As the air moves upward, it picks up heat from the lower pellets as it cools them. The relative humidity of the air is decreased by the additional heat, and the drying capacity of the air is thereby increased by the time it reaches the wetter upper pellets.

Additional efficiency in air consumption is realized by the invention in the division of the drying and cooling enclosure into a plurality of chambers or zones by means of baffles. This minimizes the short-circuiting of air through the unloaded portions of the conveyor belts.

It is the general object of this invention to provide a method and apparatus to dry and cool pelletized material by passing air at ambient temperature through the pelletized material as it is moved on a multiple-deck conveyor thruogh a compartmented enclosure.

Another object of this invention is to provide a method and an apparatus to dry and cool discrete batches of rubber-like pellets in such a manner as to reduce their tendency to agglomerate into an unworkable mass because of their soft, tacky nature.

Still another object of this invention is to provide a method and device for cooling and drying pellets of rubber-like materials in an efficient manner while using a minimum of floor space.

A still further object of the present invention is to utilize the heat removed from the pellets during the cooling operation to increase the drying capacity of the air before it comes into contact with the wetter pellets.

And yet another object of the invention is to minimize the short-circuiting of air by utilizing baffles to create a plurality of chambers through which a plurality of conveyors pass in a cascade arrangement while air is moving through layers of pellets in said chambers.

The aforesaid objects and other objects of the invention will become apparent as the nature of the invention is disclosed further.

FIGURE 1 is a top plan view of the apparatus.

FIGURE 2 is a front elevation view of the apparatus with the front plate partly removed showing the arrangement of the conveyors and baffles.

FIGURE 3 is an enlarged cross-sectional view taken along the line 3—3 showing baffle and conveyor detail.

Attention is directed to the details of the accompanying drawings so that the invention may be clearly understood.

The apparatus of the invention as shown in the drawings includes three endless conveyors 10, 11, and 12. A suitable drive means, indicated generally at 13, drives the conveyor belts 14, 15, and 16 in successively alternate directions and at successively slower speeds, respectively. The drive may consist of belts and pulleys or chains and sprockets arranged as shown schematically in FIGURE 2, or the conveyors may be equipped with individual drives.

The conveyor belts are supported by their respective driving pulleys 17, 18 and 19 and their driven pulleys 20, 21, and 22. These pulleys are supported by their respective shafts in bearings on a conventional framework, not shown.

As shown in FIGURE 3, the conveyor belts contain openings 23 which conduct air through the belts. Belts of the wire-mesh or chain-mesh type may be used with the mesh small enough to support the pellets.

The conveyors 10, 11, and 12 are surrounded by an enclosure 24 which is divided by the baffles 25 and 26 into drying and cooling chambers A, B, and C; the loading chamber D; and the unloading chamber E. The enclosure is made of sheet metal but other suitable material could be used.

Individual air blowers, not shown, communicate with the chambers A, B, and C through the air inlet ducts 27, 28, and 29, respectively, and individual air exhaust fans, not shown, communicate with the chambers through the air exhaust ducts 30, 31 and 32 and the exhaust hoods 33, 34, and 35, respectively. While individual air blowers and exhaust fans are used for each chamber, it is possible to use a single blower and a single exhaust fan with a suitable manifold arrangement.

Conveyor 36 introduces the material to be processed into the loading chamber, and conveyor 37 removes the processed material from the unloading chamber.

Deflecting plates 38 are placed at the discharge ends of conveyors 10 and 11 to ensure that the pellets will fall onto the next lower conveyor.

Baffles 25 are rigid plates mounted on either the enclosure or the frame work, as convenience dictates. Baffles 26, similarly mounted, consist of a rigid member 39 pivoted about the point 42. A flexible skirt 41 is pivoted about the point 40. Skirt 41 is fabric, but may be any flexible material such as rubber, plastic, leather and the like.

The flexible skirt 41 is placed in close proximity to the belts so that short-circuiting of air between the chambers is minimized when there are no pellets on the conveyor at the location of the baffles 26. The flexible skirt permits the pellets to pass under the baffle by flexing in the direction of the pellet travel.

In operation, a discrete batch of hot and wet pellets is introduced into the loading chamber D by the conveyor 36. The pellets fall onto the conveyor 10 which is traveling at a speed sufficient to distribute the pellets in a thin layer upon the belt 14. At this point, the temperature of the pellets is such that they may not be piled too high because of the possibility of agglomeration.

The pellets enter chamber C and move under a baffle 26. Air, which had previously entered duct 29 at ambient temperature and had been heated while it moved upward through layers of pellets on conveyors 12 and 11, passes through the openings 23 of belt 14 of conveyor 10 and through the thin layer of pellets thereupon. This heated air removes water from the pellets and, in the process, the latent heat of vaporization is to a great extent derived from the heat of the pellets, thereby cooling them.

The pellets are carried by the belt 14 under another baffle 26 and into the chamber B. In chamber B, air entering duct 28 at ambient temperature and becoming heated in its movement upward dries and cools the pellets in the same manner as the air moving in chamber C.

Similarly, the pellets conveyed into chamber A by the belt 14 are dried and cooled by the air entering duct 27 and becoming heated as it moves upward.

The air entering ducts 27, 28 and 29 is exhausted through ducts 30, 31, and 32, respectively. It is advantageous to exhaust the air from the chambers at a higher volumetric rate than it is introduced into them. This results in a negative pressure inside the chambers which aids the drying operation. Also, the negative pressure keeps dust, fines, and the like within the enclosure. And further, the pressure drop along the height of the chamber is more uniform reducing the tendency of the air flow to displace the pellets from the layers.

The pellets are conveyed from chamber A by belt 14 passing under a baffle 26 and into chamber E where they fall from belt 14 to belt 15 of conveyor 11. The pellets are guided in their fall by a deflector plate 38. The belt 15 moves at a speed slower than that of belt 14, and, as a result, the thickness of the pellet layer is increased. A batch of pellets is distributed over a length of the belt 15 which is shorter than the length occupied by the same batch on belt 14. For example, when the speed of belt 15 is adjusted to one-half of the speed of belt 14, a particular batch on belt 15 occupies one-half the length it occupied on belt 14, and the pellet layer is twice as thick The fact that the pellets have been cooled on belt 14 permits the formation of a thicker layer of pellets on belt 15. The decreased temperature of the pellets effects a corresponding decrease in the tackiness and plasticity of the pellets, and, accordingly, the pellets, being more resistant to deformation, can be piled higher without agglomerating. The temperature differential between the pellets on belt 15 and the air passing through the layer is less than that existing on belt 14, and the rate of heat transfer is correspondingly lower. The present invention utilizes the slower speed of belt 15 and the thicker layer of pellets thereon to offset the lower heat transfer rate by increasing the time which the pellets are within the chambers. In addition, because the pellet layer is thicker, the air moving through the layer is in contact with it for a longer time. This results in increased heat transfer and more efficient use of the air.

The pellets are conveyed by belt 15 through chambers A, B, and C, successively, in the opposite direction from that of belt 14. Belt 15 conveys the pellets from chamber C into chamber D where they fall upon belt 16 of conveyor 12. Again, a deflector plate 38 guides the pellets in their fall.

Belt 16 conveys the pellets through chambers C, B, and A, successively, in the opposite direction from that of belt 15. Belt 16 travels at a speed slower than that of belt 15, thereby increasing the thickness of the pellet layer and decreasing the length of conveyor occupied by a particular batch of pellets. The additional cooling performed on the pellets while they were on belt 15 permits the increase in the layer thickness on belt 16 for the reason hereinbefore given.

The temperature differential between the pellets and the air is smaller on belt 16 than that existing on belt 15, and, as previously described, this fact is offset by the slower speed of belt 16.

Belt 16 conveys the pellets from chamber A to chamber E where they fall upon conveyor 37 and pass under a baffle 26, out of the enclosure 24, and into storage.

In a typical application of the invention, the pellets enter the apparatus at a temperature of approximately 300° F. and emerge approximately ten minutes later at a temperature of approximately 100° F. when the ambient temperature is 90° F. The successive belts travel at speeds of 12, 6, and 4 feet per minute. The interval between batches is approximately one minute.

In a typical apparatus, the total drying and cooling zone is 21 feet long, divided chambers A, B, and C, each 7 feet long. Belts 14, 15, and 16 are each 4 feet wide. A typical batch of rubber pellets occupies 13 cubic feet. In practice, it has been determined that pellets at 300° F. can be conveyed in a layer 2 inches thick without agglomerating.

Thus, with belt 14 moving at 12 feet per minute, the batch occupies 19½ feet of the length of belt 14. The unoccupied portion of belt 14, based on a time interval of one minute between batches, is 12 feet in length. On the same basis, the batch occupies 9¾ feet of length on belt 15, the pellet layer is 4 inches thick, and the interval between batches is 6 feet. On belt 16, the batch occupies 6½ feet of length, the pellet layer is 6 inches thick, and the interval between batches is 4 feet.

If the enclosure 24 were not divided into chambers A, B, and C, most of the air would follow the path of least resistance and short circuit through the unoccupied portions of the belts 14, 15, and 16, doing little drying or cooling before being exhausted to the atmosphere. By arranging the belts in cascade, one below the other, and dividing the enclosure into chambers, the short-circuiting of air is minimized.

While the preferred form of the invention is described as including three conveyors in a cascade arrangement, it will be understood that the advantages of the invention can be realized with two or more conveyors in cascade. As the number of conveyors is increased, the possibility of short-circuiting the air through any drying and cooling chamber diminishes and the air moving upward in the chamber is more efficiently utilized.

While the preferred form of the invention is shown as including three drying and cooling chambers, it can be readily seen that a further division of the enclosure into additional chambers would result in the diminishing possibility of the air short-circuiting.

Thus, the number of conveyors and chambers may be changed without departing from the spirit or scope of the invention.

While a certain preferred embodiment of the invention has been shown and described, the invention is not limited thereby since changes in the number, size, shape and arrangement, for instance, of the various parts may be made without departing from the spirit or scope of the invention as shown and described in the foregoing specification and drawings.

What is claimed is:

Apparatus for treating plastic material, comprising an enclosure, a plurality of vertically arrayed, open-structured conveyors in said enclosure, means to introduce subdivided, inherently tacky material in a hot, wet state on the topmost of said conveyors, means driving said conveyors to transport said material along said conveyors, at progressively slower speeds and in alternate directions at successively lower levels, means to receive said subdivided material in a cooled, dried state at the bottom of said apparatus, baffles dividing said enclosure into a plurality of vertical chambers, each said conveyor extending through each said chamber, and means to force air at ambient temperature into the lower portion of said chambers and thereafter vertically therethrough and to simultaneously increase the drying capacity of said air toward the top of said apparatus by passage through portions of said material of progressively greater heat content.

References Cited in the file of this patent

UNITED STATES PATENTS

| | | |
|---|---|---|
| 234,412 | Lee et al. | Nov. 16, 1880 |
| 640,319 | Perkins | Jan. 2, 1900 |
| 1,446,054 | Maus | Feb. 20, 1923 |
| 1,472,314 | Webster | Oct. 30, 1923 |
| 1,476,424 | Sargent | Dec. 4, 1923 |
| 1,551,818 | Garnsey | Sept. 1, 1925 |
| 1,602,830 | MacPherran | Oct. 12, 1926 |

FOREIGN PATENTS

| | | |
|---|---|---|
| 226,409 | Switzerland | July 1, 1943 |